(12) United States Patent
Ambar et al.

(10) Patent No.: US 11,493,855 B2
(45) Date of Patent: Nov. 8, 2022

(54) ADJUSTING PRINT APPARATUS LIGHT SOURCES

(71) Applicant: Hewlett-Packard Development Company, L.P., Spring, TX (US)

(72) Inventors: Oron Ambar, Ness Ziona (IL); Zvi Erlich, Ness Ziona (IL); Haim Vladomirski, Ness Ziona (IL); Rodolfo Jodra Barron, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/298,006

(22) PCT Filed: May 31, 2019

(86) PCT No.: PCT/US2019/034983
§ 371 (c)(1),
(2) Date: May 27, 2021

(87) PCT Pub. No.: WO2020/242498
PCT Pub. Date: Dec. 3, 2020

(65) Prior Publication Data
US 2022/0113649 A1 Apr. 14, 2022

(51) Int. Cl.
*G03G 15/043* (2006.01)
*G03G 15/00* (2006.01)
(Continued)

(52) U.S. Cl.
CPC .......... *G03G 15/043* (2013.01); *G03G 15/10* (2013.01); *G03G 15/5004* (2013.01);
(Continued)

(58) Field of Classification Search
CPC .. G02B 26/123; G02B 26/101; G02B 27/102; G02B 27/104; G02B 27/108; G02B 27/1086; G02B 27/141; G02B 27/145; H04N 1/047; H04N 1/0473; H04N 1/1135; H04N 1/12; H04N 1/192;
(Continued)

(56) References Cited

U.S. PATENT DOCUMENTS

4,857,944 A 8/1989 Hart et al.
5,323,179 A 6/1994 Sanger et al.
(Continued)

*Primary Examiner* — Negussie Worku (57) ABSTRACT

A light source adjustment apparatus is disclosed. The light source adjustment apparatus includes processing apparatus to receive a scanned image of a pattern printed by a print apparatus onto a printable medium, the pattern including a plurality of blocks of print agent of a first colour printed during a printing operation in which light sources of a light source array irradiate a photoconductive surface; analyse the scanned image to identify a region of non-uniformity within the plurality of blocks of print agent; correlate a location of the identified region of non-uniformity with a corresponding light source in the light source array; determine, based on the identified region of non-uniformity, an adjustment to be made to a parameter of the corresponding light source; and generate a signal to effect the determined parameter adjustment with regard to the corresponding light source. A method and a print apparatus are also disclosed.

15 Claims, 7 Drawing Sheets

(51) Int. Cl.
*G03G 15/10* (2006.01)
*H04N 1/00* (2006.01)

(52) U.S. Cl.
CPC ..... *G03G 15/5062* (2013.01); *H04N 1/00015* (2013.01); *H04N 1/00039* (2013.01); *H04N 1/00087* (2013.01)

(58) Field of Classification Search
CPC .......... H04N 2201/03158; H04N 2201/03162; H04N 2201/0471; H04N 2201/04712; H04N 2201/04729; H04N 2201/04731; H04N 2201/04732; H04N 2201/04734; H04N 2201/04744; H04N 2201/04767; H04N 2201/04787; H04N 2201/04789; H04N 2201/04791; H04N 1/0285; H04N 1/0315; H04N 1/0318; H04N 1/1017; H04N 1/1026; H04N 1/40056; H04N 2201/0418; H04N 9/3102; H04N 9/3129; H04N 9/3155; H04N 9/3161; H04N 9/3179; H04N 9/3194; G01N 21/255; G03B 21/005; G03B 21/20; G03B 21/2046; G03B 21/2053; G03B 21/28; G03B 27/62; G03B 33/12; G03G 15/607; G09G 2300/023; G09G 2320/062; G09G 2320/106; G09G 2340/0407; G09G 2360/142; G09G 2360/18; G09G 3/02; G09G 3/2096; G09G 3/342; G09G 3/3433; G09G 5/363
USPC ......................................... 358/474, 475, 509
See application file for complete search history.

(56) References Cited

U.S. PATENT DOCUMENTS

| | | | |
|---|---|---|---|
| 5,586,055 A | 12/1996 | Ng et al. | |
| 5,754,305 A | 5/1998 | DeClerck et al. | |
| 5,877,846 A | 3/1999 | Tahara et al. | |
| 6,389,241 B1* | 5/2002 | Cernusak ........... | G03G 15/2003 399/45 |
| 6,819,352 B2 | 11/2004 | Mizes et al. | |
| 7,567,267 B2 | 7/2009 | Barron | |
| 7,787,006 B2* | 8/2010 | Sakai ....................... | B41J 2/473 347/240 |
| 10,126,696 B1 | 11/2018 | Kuo et al. | |
| 10,187,547 B2* | 1/2019 | Watanabe .......... | H04N 1/00748 |
| 10,341,506 B2* | 7/2019 | Garcia ............... | H04N 1/00034 |
| 2004/0183886 A1 | 9/2004 | Regelsberger et al. | |
| 2004/0246533 A1* | 12/2004 | Touura ................. | H04N 1/6072 358/461 |
| 2006/0023271 A1 | 2/2006 | Boay et al. | |
| 2006/0066904 A1* | 3/2006 | Fischer .............. | H04N 1/40075 358/1.18 |
| 2007/0216747 A1* | 9/2007 | Blair .................. | H04N 1/00063 347/132 |
| 2008/0030529 A1* | 2/2008 | Lapstun .................... | B41J 3/36 347/2 |
| 2008/0123097 A1* | 5/2008 | Muhammed .............. | G01J 3/02 356/419 |
| 2009/0141994 A1* | 6/2009 | Stevens ................ | H04N 19/182 382/237 |
| 2010/0014893 A1* | 1/2010 | Lange ................ | G03G 15/0194 399/302 |
| 2016/0239728 A1* | 8/2016 | Suzuki ................ | G06K 15/027 |
| 2018/0020127 A1* | 1/2018 | Kim ...................... | H04N 1/6077 |
| 2018/0084146 A1* | 3/2018 | Mikami ................ | H04N 1/401 |

* cited by examiner

ADJUSTING PRINT APPARATUS LIGHT SOURCES

BACKGROUND

In some printing systems, such as a liquid electrophotography (LEP) printing system, light-emitting elements on a "writing head" may be used to selectively discharge portions of a photoconductive surface that are to receive print agent.

Manufacturing inconsistencies in various components, including the writing head and/or the light-emitting elements thereof, may give rise to regions of non-uniformity in an image printed using such components.

BRIEF DESCRIPTION OF DRAWINGS

Examples will now be described, by way of non-limiting example, with reference to the accompanying drawings, in which.

DETAILED DESCRIPTION

In a liquid electrophotography (LEP) print apparatus, print agent, such as ink, may pass through a print agent application assembly, such as a binary ink developer (BID). Each BID handles print agent of a particular colour, so an LEP printing system may include, for example, seven BIDs. Print agent from a BID is selectively transferred from a print agent transfer roller—also referred to as a developer roller— of the BID in a layer of substantially uniform thickness to a photoconductive surface, such as a photo imaging plate (PIP). The selective transfer of print agent is achieved through the use of an electrically-charged print agent, also referred to as a "liquid electrophotographic ink". As used herein, a "liquid electrophotographic ink" or "LEP ink" generally refers to an ink composition, in liquid form, generally suitable for use in a liquid electrostatic printing process, such as an LEP printing process. The LEP ink may include chargeable particles of a resin and a pigment/colourant dispersed in a liquid carrier.

The LEP inks referred to herein may comprise a colourant and a thermoplastic resin dispersed in a carrier liquid. In some examples, the thermoplastic resin may comprise a copolymer of an alkylene monomer and a monomer selected from acrylic acid and methacrylic acid. In some examples, the thermoplastic resin may comprise a copolymer of an ethylene acrylic acid resin, an ethylene methacrylic acid resin or combinations thereof. In some examples, the thermoplastic resin may comprise an ethylene acrylic acid resin, an ethylene methacrylic acid resin or combinations thereof. In some examples, the carrier liquid is a hydrocarbon carrier liquid such as an isoparaffinic carrier liquid, for example Isopar-L™ (available form EXXON CORPORATION), In some examples, the electrostatic ink also comprises a charge director and/or a charge adjuvant. In some examples, the charge adjuvant includes aluminum di- or tristearate. In some examples, the liquid electrostatic inks described herein may be ElectroInk® and any other Liquid Electro Photographic (LEP) inks developed by Hewlett-Packard Company.

Figure 1:
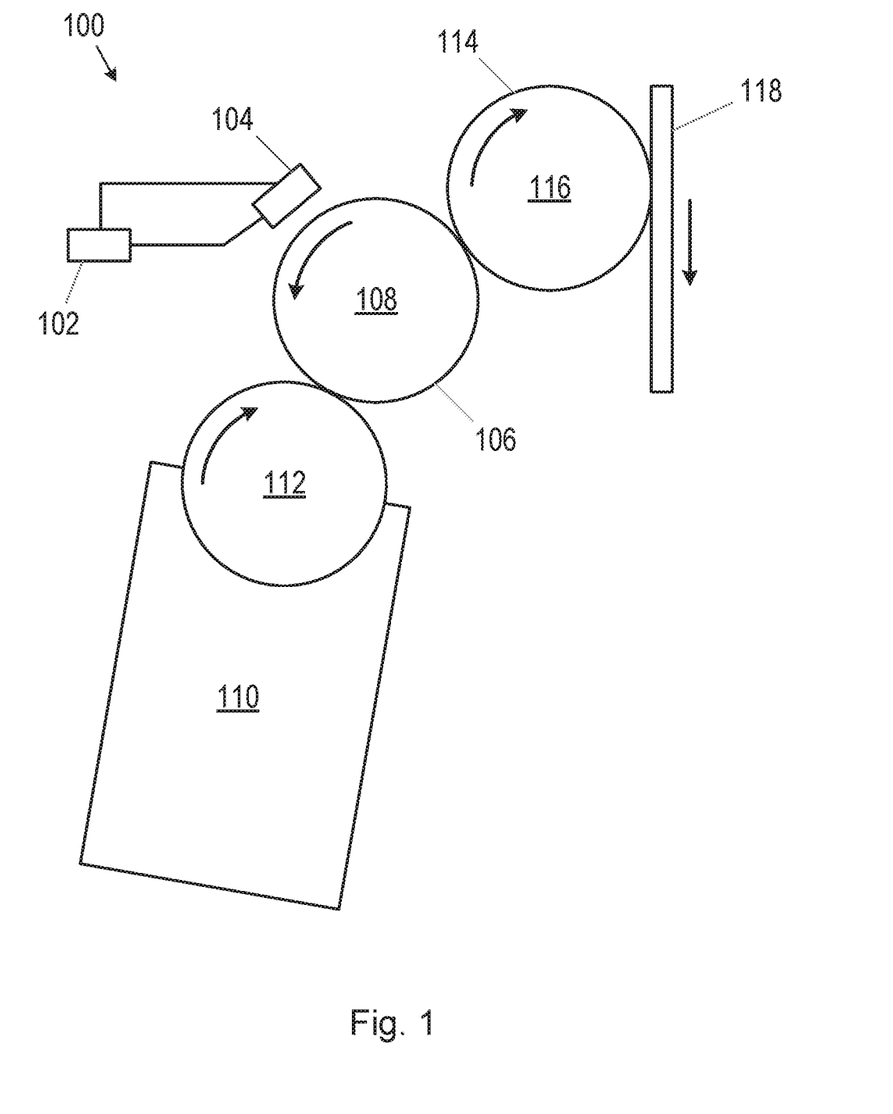
FIG. 1 is a schematic illustration of an example of a liquid electrophotography print apparatus.

Referring now to the drawings, FIG. 1 is a schematic illustration of various components of a print apparatus 100. Aspects of the present disclosure may be applicable to liquid electrophotography (LEP) print apparatus, and various examples are described in relation to such print apparatuses. However, it will be understood that the present disclosure is also relevant to other types of print apparatuses. FIG. 1 shows the components of a print apparatus 100, such as an LEP print apparatus. Data representing an image to be printed is received by a processor 102, which controls a print head, or writing head, 104 to form a latent image on a photoconductive surface 106 by selectively discharging portions of a charged surface. The photoconductive surface 106 may, in some examples, comprise the surface of a drum or roller 108. In other examples, the photoconductive surface 106 may comprise the surface of a blanket which may, for example, be formed on or around the drum or roller 108.

The writing head 104 comprises a plurality of light sources (not shown in FIG. 1) which, under control of processing circuitry (e.g. the processor 102), direct radiation onto the photoconductive surface 106 according to the image to be printed, to selectively discharge the photoconductive surface in portions that are to receive print agent. The light sources may, in some examples, comprise light-emitting diodes (LEDs), The number of light sources included in the writing head 104 may be selected based on the intended purpose (e.g. based on the particular print apparatus in which the writing head is to be installed). In some examples, each light source may correspond to a single pixel to be printed onto a printable substrate, so the writing head addressability may be equal to a press addressability of the print apparatus. In some examples, a writing head may have an addressability of between around 1000 DPI (dots per inch) and around 1600 DPI. In other examples, a writing head may have a greater addressability, such as 1800 DPI or 2000 DPI. For example, 1200 DPI addressability means that the writing head has 1200 light sources (e.g. LEDs) per inch. The light sources may, in some examples, be arranged on chips. In one example, each chip may include 384 light sources. During manufacture of the writing head, a plurality of such chips may be mounted and mechanically aligned in order to achieve a focal plane having an intended uniformity.

The writing head 104 may also include, be associated with, or function is in conjunction with an optical element to focus the radiation emitted from the light sources. In some examples, a single optical element may be used to focus light from multiple light sources while, in other examples, each light source may have a corresponding optical element to focus its radiation. The optical element may, in some examples, comprise a lens or multiple lenses. In examples where multiple elements are provided, a lens array may be positioned near to, or adjacent to, the light sources to focus the emitted radiation. The purpose of the optical element(s) is to focus radiation from the light sources onto the photoconductive surface 106, so that the resulting printed image appears clear and sharp.

Once a latent image has been formed on the photoconductive surface 106, print agent (e.g. electrically charged LEP ink) is selectively transferred onto the discharged regions of the photoconductive surface. In the example shown, print agent is provided from a print agent application assembly 110, also referred to as a binary ink developer, or BID. The print agent application assembly 110 includes various components in addition to those shown, which transfer print agent onto a developer roller 112. In the example shown, the developer roller 112 rotates in a direction opposite to the direction of rotation of the roller 108, as shown by the arrows in FIG. 1. Print agent is transferred from the developer roller 112 onto the discharged portions of the photoconductive surface 106 and, subsequently, onto a transfer medium 114, sometimes referred to as an intermediate transfer medium, or ITM. The transfer medium 114 may comprise a surface of drum or roller 116 which may, in some examples, be referred to as a blanket drum. In other examples, the transfer medium 114 may be formed around the drum or roller 116. The roller 116 rotates in a direction opposite to the direction of rotation of the roller 108 and, as it rotates, print agent in the intended image to be printed is transferred from the transfer medium 114 onto a printable substrate 118 moving relative to the transfer medium in the direction of the arrow.

In some examples, print agent of different colours may individually be transferred (e.g. each colour from a separate print agent application assembly 110) onto a single photoconductive surface 106. In other examples, a print apparatus may include a separate photoconductive surface 106 and corresponding writing head 104 for each colour of print agent.

Manufacturing inconsistencies may lead to an unintended focal plane curvature resulting, for example, from misalignment of the light sources (or chips) and/or the optical elements. Such misalignments may lead to inconsistencies in the diameters of spots and/or the shape of spots of radiation emitted from the writing head 104 and incident on the photoconductive surface 106. Such inconsistencies and optical variations may lead to print defects, such as banding, in the resulting printed image.

Examples disclosed herein provide a mechanism by which a printed image may be analyzed to identify any non-uniformity or inconsistency in the printed output, and an appropriate compensation or correction may be made to reduce the effects of the identified print defect. Moreover, the analysis and compensation may be performed on-press (i.e. using the print apparatus rather than remote from the apparatus), which may allow for improved print quality and increased production yield.

Figure 2:
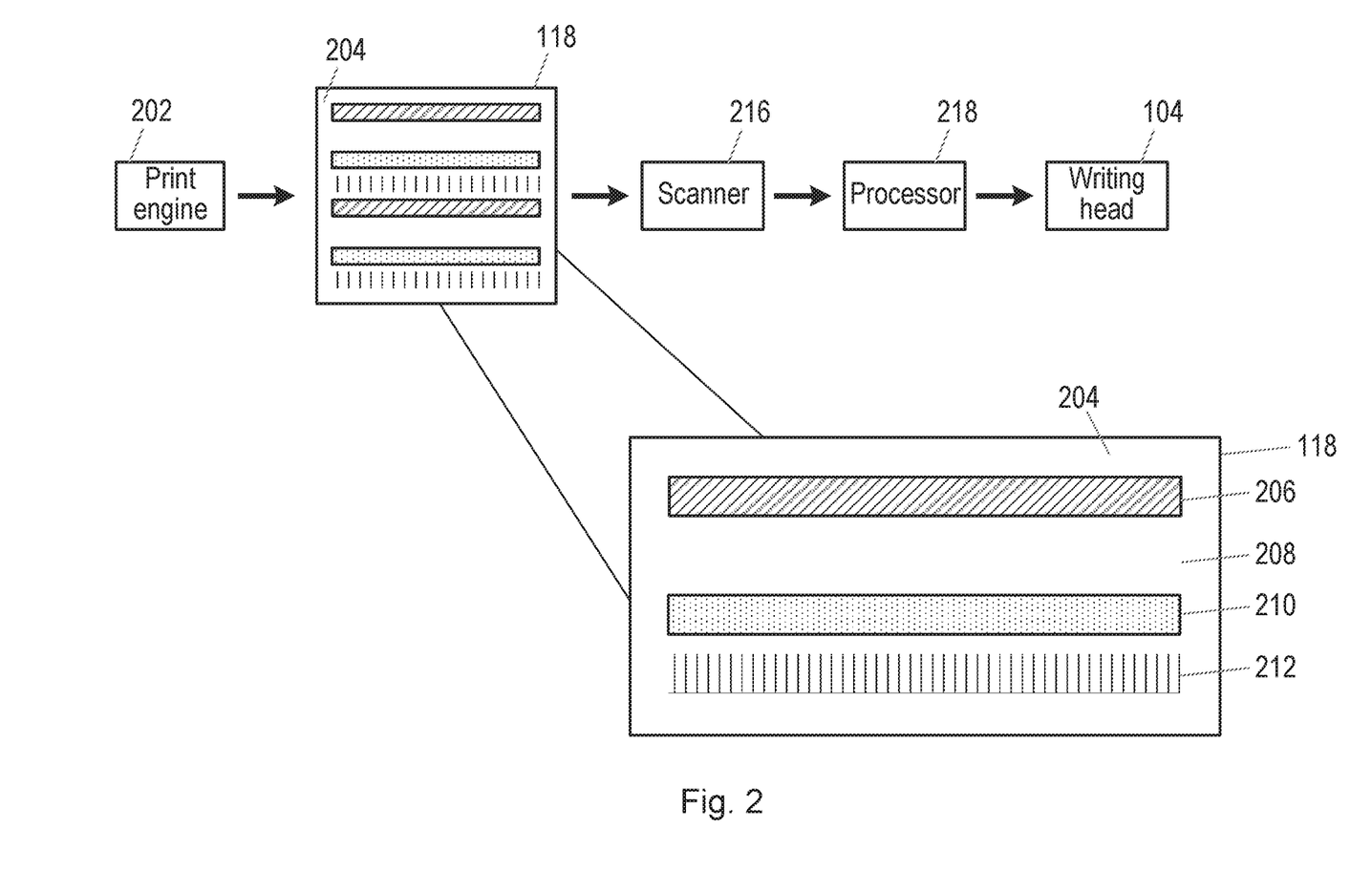
FIG. 2 is a schematic illustration of an example of a light source adjustment process.

FIG. 2 is a schematic illustration of an example of part of a light source adjustment process. At block 202, a print engine of the print apparatus 100 is operated to print an image or pattern 204 onto the printable substrate 118. As can be seen in the enlarged portion of FIG. 2, the printed pattern 204 may include various patches or blocks 206, 210 of print agent and an unprinted region 208. A patch or block 210 of print agent of a first colour may, for example, comprise print agent of the colour grey. In other words, the block 210 of print agent may be printed in greyscale. The printed pattern 204 may also include an unprinted region 208 in which the substrate 118 is visible. The printed pattern 204 may also include a patch or block 206 of print agent of a second colour which, in some examples, may comprise print agent of the colour black or some other colour which can be printed using the print apparatus 100. In some examples, the printed pattern 204 may also include position indicators. In the example shown in FIG. 2, the printed pattern 204 includes a position indicator 212. As used herein, the "substrate transport/movement direction" is intended to indicate the direction in which the printable substrate 118 is transported through the print apparatus 100 during a printing operation. The position indicator 212 is discussed in greater detail below. In general, however, the position indicator 212 may be used to determine which light source or subset of the plurality of light sources in the writing head 104 were responsible for (i.e. correspond to) each part of the printed pattern 204. In some examples, this may be achieved by printing a position indicator 212 which includes a unique pattern or "signature" at various positions throughout the printed pattern 204 such that, from inspecting just a small portion of the printed pattern 204, it is possible to determine the position of that portion on the printable substrate 118 and, therefore, the corresponding light source(s) responsible for printing that portion of the pattern.

The pattern 204, comprising the patch 206, the unprinted region 208, the patch 210 and, optionally, the position indicator 212, may be repeated multiple times on the printable substrate 118, for example in the substrate transport direction. Thus, a single sheet or page of print substrate 118 may include multiple instances (e.g. 2, 3, 4 or more) of the pattern 204.

Once the pattern 204 has been printed onto the printable substrate 118, the printable substrate is scanned, for example using a scanning apparatus 216. In some examples, the scanning apparatus 216 may comprise a scanner which forms part of the print apparatus 100. For example, the scanner may comprise an in-line scanner of a print apparatus which may also be used for other functions. In other examples, the scanning apparatus 216 may comprise a scanner that is separate from and/or remote from the print apparatus 100. In such examples, the scan may be used to scan the pattern 204 printed onto the printable substrate 118, and a scanned image may be obtained and provided for further processing.

A scanned image (e.g. the output of the scanning process performed by the scanning apparatus 216) may be provided to processing apparatus 218 for analysis. As is explained in greater detail below, the processing apparatus, which may comprise a processor, multiple processors or processing circuitry forming part of the print apparatus 100 or located remotely from the print apparatus, may analyze the scanned image to identify any regions of non-uniformity in the patch 210 of print agent. By using greyscale printing to print the patch 210 of print agent in the pattern, any non-uniformity in the patch may more readily be identified than if other colours of print agent are used. Greyscale is used rather than synthetic lines and/or dots since it shows the same non-uniformities as would appear in an image printed using colour.

If a region of non-uniformity is identified within the patch 210 of the pattern 204, then the processing apparatus 218 may also determine (e.g. using the position indicator 212) which light source or group of light sources in the plurality of light sources on the writing head 104 were responsible for emitting radiation onto the photoconductive surface 106, which resulted in the non-uniform region. The processing apparatus 218 may also determine, based on the degree of non-uniformity in the patch 210, how the light source or light sources may be adjusted to correct for (e.g. remove, or reduce) the non-uniformity. For example, if the non-uniformity comprises a region in which more print agent has been delivered than intended (e.g. if more print agent has been delivered in the region than has been delivered elsewhere in the patch 210), then an operating power of, or a current supplied to, the corresponding light source(s) may be reduced and, if the non-uniformity comprises a region in which the less print agent has been delivered than intended (e.g. if less print agent has been delivered to the region than has been delivered elsewhere in the patch 210), then an operating power of, or a current supplied to, the corresponding light source(s) may be increased. The amount by which the power/current may be reduced or increased may be determined based on the severity of the non-uniformity.

Once the intended amount of correction, or adjustment, has been determined by the processing apparatus 218, the processing apparatus may effect an adjustment to the relevant light source(s) in the writing head 104, For example, the processing apparatus 218 may interact with the writing head 104 or the light sources thereof to effect the adjustment, or the processing apparatus may generate a control signal or instruction signal to cause some other component to effect the intended adjustment. With the adjustment having been made, the non-uniformity in the patch 210 should be reduced or removed, and image is printed by the print apparatus 100 subsequently should exhibit fewer print defects, and fewer signs of non-uniformity resulting from the light sources.

Figure 3:
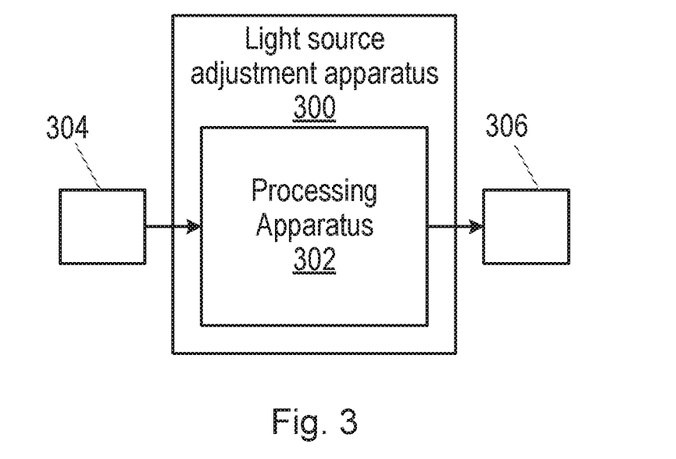
FIG. 3 is a schematic illustration of an example of a light source adjustment apparatus.

FIG. 3 is a schematic illustration of an example of a light source adjustment apparatus 300. The light source adjustment apparatus 300 comprises processing apparatus 302 which may, in some examples, comprise processing circuitry, a processor or multiple processors. The light source adjustment apparatus 300 may, in some examples, form part of, or be associated with, a print apparatus, such as the print apparatus 100. In other examples, the adjustment apparatus 300 may be remote from the print apparatus, and may communicate with the print apparatus, or with a processor thereof, via a wired connection or a wireless connection. The adjustment apparatus 300 may, in some examples comprise, or form part of, a computing device, such as a desktop computer, a laptop computer, tablet computer or a smartphone. The light source adjustment apparatus 300 may, for example, be implemented in, or as part of, a digital printing system.

The processing apparatus 302 is to receive a scanned image 304 of a pattern 202 printed by a print apparatus 100 onto a printable medium 118, the pattern including a plurality of blocks 210 of print agent of a first colour printed during a printing operation in which light sources of a light source array irradiate a photoconductive surface 106. Thus, while, in some examples, the scanned image 304 may be received directly from the scanning apparatus 218 (i.e. directly from a scanner of the print apparatus 100), in other examples, the scanned image may be received from some other source, such as a storage medium or another processing apparatus.

The processing apparatus 302 is also to analyse the scanned image 304 to identify a region of non-uniformity within the plurality of blocks 210 of print agent. The analysis may, for example, comprise measuring reflectance values. Thus, the scanner used to scan the pattern and to generate the scanned image may comprise, or include, components to measure reflectance. In some examples, a region of non-uniformity may be identified if a reflectance value at a particular region of print agent in the block 210 of print agent meets or exceeds (drops below or rises above) defined threshold values. The defined threshold values may, for example, be threshold values relative to an average of the measured values. For example, the threshold may be defined as 0.5% from the average reflectance measured for positions along the extent of the writing head. In other words, a region of non-uniformity may be identified if the reflectance value is determined to be outside of a defined range relative to an average value. The defined threshold values and/or the defined range may be selected based on the intended level of uniformity for the particular print apparatus. For example, non-uniformities that cannot be identified by the human eye may be ignored.

The processing apparatus 302 is also to correlate a location of the identified region of non-uniformity with a corresponding light source in the light source array. As explained above, such a correlation may be achieved using the position indicator 212, One example of how the processing apparatus 302 may form the correlation is shown in FIG. 4.

Figure 4:
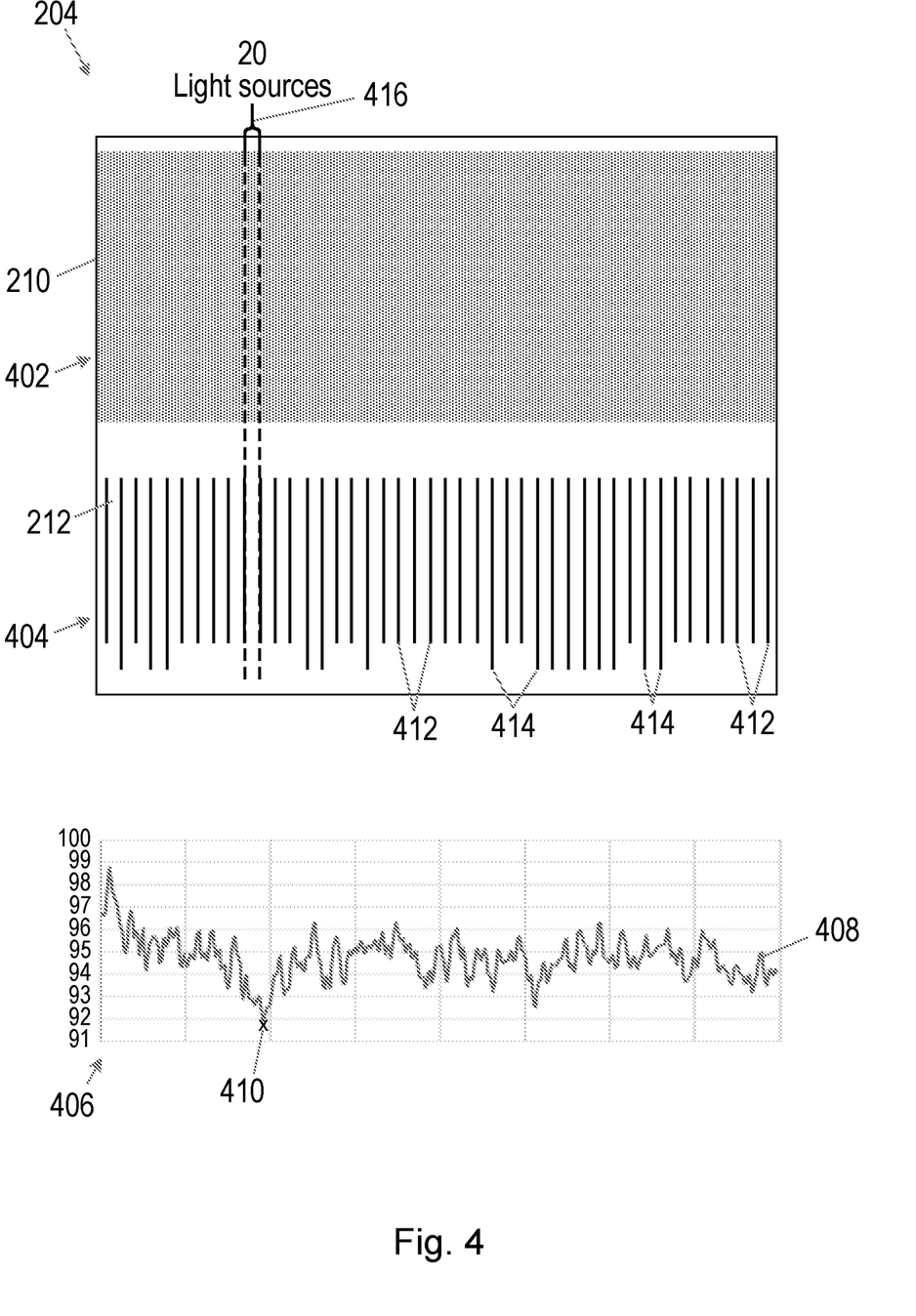
FIG. 4 is an example of a correlation between an identified non-uniformity and a light source.

FIG. 4 shows a portion of the pattern 204 printed onto the printable substrate 18. The portion of the pattern 204 shown in FIG. 4 includes a portion 402 of the patch 210 of print agent and a corresponding portion 404 of the position indicator 212. Shown below the pattern 204 in FIG. 4 is a graph 406 representing greyscale values (e.g. in a range from 0 to 255)—which have been translated into dot area (DA) values in a range 0% to 100%—measured in respect of the portion 402 of the patch 210. As explained below, dot area values represent a normalised measure, taking into account the colour of the printable substrate 118 and pigment in the print agent. A line of 408 within the graph 406 shows how the greyscale values vary across patch 210. For a perfectly uniformly printed patch 210, the greyscale values could be expected to be constant. However, due to inconsistencies and non-uniformity is in the light source array, the focal plane of the light source array varies across the light sources, leading to the non-constant greyscale value measurements or DA values when translated into DA values. At one point 410 in the graph 406, the line 408 indicates that a greyscale value measurement is around 92. Depending on the intended uniformity, 92 may fall below the defined threshold lower value relative to the average greyscale value for the patch 210 and, as such, the processing apparatus 218 may determine that this region of the patch 210 constitutes a non-uniformly printed region.

From the portion 404 of the position indicator 212 shown in FIG. 4, the light sources of the light source array that correspond to the non-uniform part of the patch 210 may be determined. The position indicator 212 may comprise a series of parallel lines, each having a first length 412 or a second, longer length 414. The sequential pattern of the lines in the position indicator 212 may be such that, based on a defined number of lines, a position of the portion of the pattern 204 relative to the entire pattern printed onto the printable substrate 118 may be determined. That is to say, each subset of a defined number of the lines in the position indicator 212 may have a unique combination or sequence of shorter lines 412 and longer lines 414. In one example, the position of the portion of the pattern 204 amongst the whole pattern printed onto the printable substrate 118 may be determined based on analysis of just 32 adjacent lines.

In the example shown in FIG. 4, a region 416 is identified as a non-uniformly printed region. In this example, the region 416 between two adjacent lines 412, 414 in the position indicator 212 represents 20 light sources in the light source array. Once the correlation between the identified non-uniform region 416 and the corresponding light sources has been determined, a determination may be made regarding an adjustment to be made to a parameter of the identified light source(s) (in this case, 20 light sources) in order to correct the non-uniformity. Thus, with reference again to FIG. 3, the processing apparatus 302 is also to determine, based on the identified region (e.g. the region 416) of non-uniformity, an adjustment to be made to a parameter of the corresponding light source. The parameter adjustment may, in some examples, comprise an adjustment of a current applied to the corresponding light source. In some examples, the parameter to be adjusted may comprise a current control parameter, such as a duty cycle of the current applied to a light source and/or an amplitude of the current applied to a light source.

In the example shown in FIG. 4, the processing apparatus 302 may determine the appropriate adjustment to be made to, for example, a current to be applied to the relevant light sources to increase the greyscale value (also referred to as a grey level) from 92 up to around 95. If, for example, the processing apparatus 302 were to determine that a printed greyscale value associated with a particular portion of print agent exceeds a defined threshold value, then it may be determined that too much print agent has been deposited in that region and, accordingly, an appropriate parameter adjustment may be made, for example to reduce a current supplied to a light source or light sources corresponding to the identified region.

The processing apparatus 302 is also to generate a signal 306 to effect the determined parameter adjustment with regard to the corresponding light source. The signal may, for example, be transmitted directly to a light source or light sources in the writing head 104 or to a component capable of adjusting the parameter with regard to the light source(s).

As noted previously, and as shown in FIG. 2, the plurality of blocks 210 of print agent in the pattern 204 may be spaced over an extent of the printable substrate 118, for example in a direction parallel to the substrate transport direction. In some examples, the plurality of blocks 210 of print agent may comprise halftone patches. The first colour may, in some examples, comprise grey. The pattern 204 may, in some examples, further include a plurality of blocks 206 of print agent of a second colour, different from the first colour. As noted above, the second colour may, in some examples, comprise the colour black. In some examples, the pattern 204 may further include a plurality of un-printed regions 208, such that no print agent is deposited onto the printable substrate 108 within the regions 208. The pattern 204 may, in some examples, further include a position indicator 212 to correlate a particular portion (e.g. a portion 416) of a block 210 of print agent of the first colour with a corresponding light source of the light source array.

As noted above, the processing apparatus 302 is, in some examples, to identify a region within the plurality of blocks 210 of print agent as a region of non-uniformity if a reflectance (or a measured greyscale value) of the print agent within the region falls outside of a defined range of reflectance values (or greyscale values), for example relative to an average value of the measure reflectance values (or greyscale values) over a block 210. In some examples, the reflectance/greyscale values measured in respect of the block 210 of print agent (e.g. a greyscale halftone block of print agent) may be converted or translated into an equivalent measure of dot area (DA) density. Dot area density, also referred to as just "dot area" provides a way of expressing the size of a halftone dot (e.g. a halftone sport of print agent) as a percentage of the total surface area, ranging from 0% (no dot) to 100% (solid ink density), Such a translation is made possible by measuring reflectance/greyscale values in respect of print agent in the box 206 of print agent of the second colour and of the substrate in the unprinted regions 208. By analyzing reflectance/greyscale values in respect of these regions, it is possible to take account of exposure variations resulting from the scanner used to obtain the scan image. Once any exposure variations caused by the scanner have been identified, it is possible to compensate for these variations and, therefore, to translate the measured reflectance/greyscale for the block 210 of print agent into equivalent dot area density values. By using dot area, rather than reflectance/greyscale values themselves, the controller measure becomes independent of the substrate type and colour and independent of ink pigments in the print agent. In other words, translating the reflectance/greyscale into dot area density values constitutes a normalisation process.

In one example, the normalisation from reflectance values to dot area values may be expressed as:

Dot Area[i]=(First Colour[i]−Substrate[i])/(Second Colour[i]−Substrate[i])

where [i] is a light source positioned index, and "First Colour", "Substrate" and "Second Colour" are reflectance values measured for the print agent of the first colour, the substrate, and the print agent of the second colour, respectively. An equivalent normalisation may be performed using greyscale values rather than reflectance values.

The processing apparatus 302 may, in some examples, repeat its analyzing, correlating, determining and generating processes iteratively in order to improve the uniformity of the light sources one iteration at a time, until a predefined stop criterion is met. For example, the various processes may be repeated iteratively until the uniformity of the light sources reaches a defined threshold level or, conversely, until the identified non-uniformity is reduced to below a defined threshold level.

In some examples, the dot area values may be used to determine the adjustment to be made to a parameter of the light source. A default factor may, in some examples, be applied to determine the adjustment. For example, a factor of 2 may be used, such that for every 1% of non-uniformity in a dot area value, a parameter (e.g. power or current) of the corresponding light source is adjusted by 2%. However, with each iteration, the factor may be adjusted by performing a calculation. For example, for an adjustment of the power of an LED:

$$\Delta Power = \frac{(Power_{LED}[k, \text{Iteration } N] - Power_{LED}[k, \text{Iteration } N-1])}{(DA[k, \text{Iteration } N] - DA[k, \text{Iteration } N-1])}$$

where ΔPower is the power adjustment factor to be applied, k is the LED index (i.e. the position of the LED/light source in the light source array of the writing head 104), and $Power_{LED}$ is the power of the light source k in a particular iteration.

By updating the adjustment factor in this way, the apparatus and methods disclosed herein may be used for print apparatuses 100 with various operating parameters (such as press speed, and the like), using an arbitrarily selected initial factor. The adjusted factor may be stored in a storage medium (e.g. a database of a memory) of the print apparatus, so that it can be used as the initial factor in subsequent calibrations. In this way, the number of iterations to be performed during subsequent calibrations may be reduced.

Figure 5:
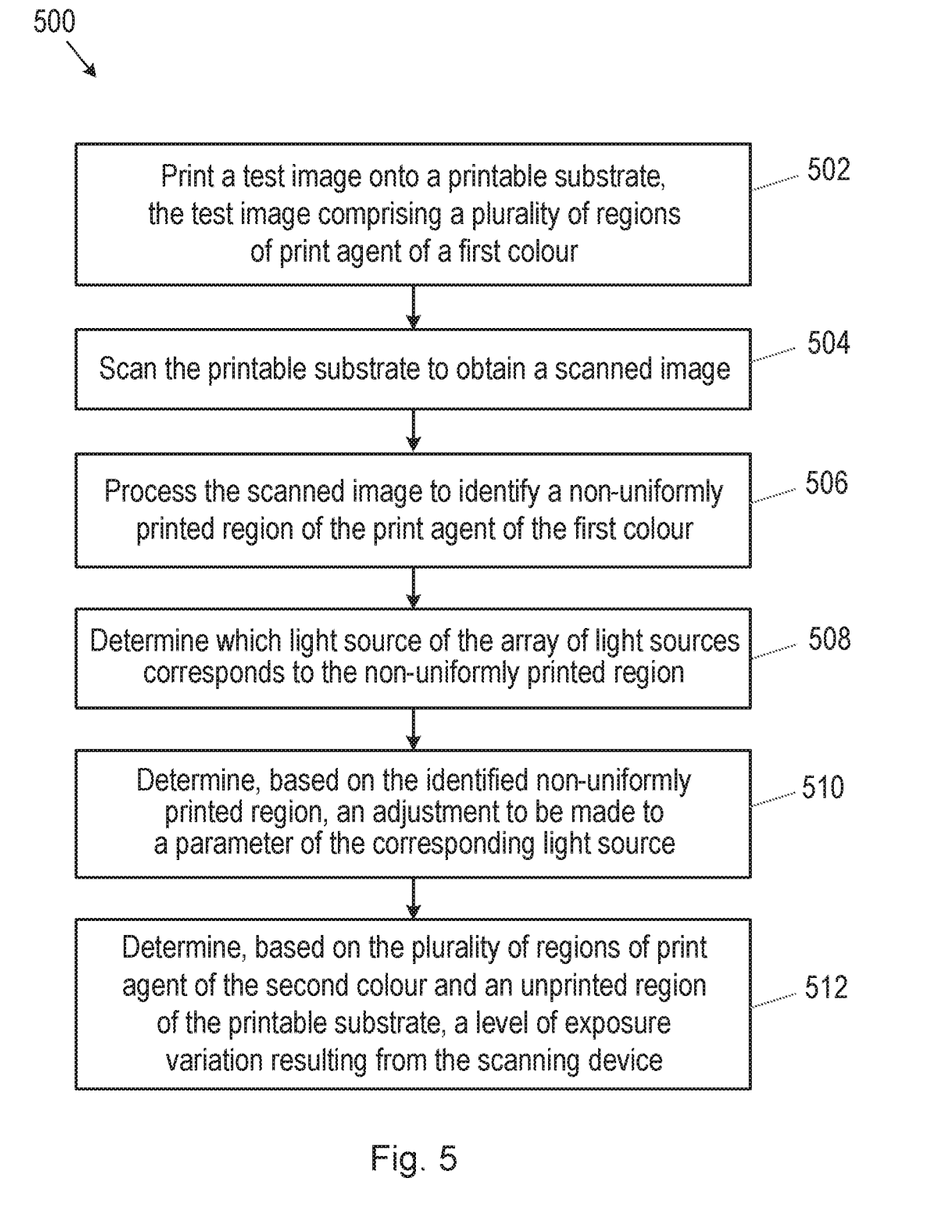
FIG. 5 is a flowchart of an example of a light source uniformity correction method.

FIG. 5 is a flowchart of an example of a light source uniformity correction method 500. The method 500 comprises, at block 502, printing, using a print apparatus 100 in which an array of light sources emit radiation onto a photoconductive surface 106, a test image onto a printable substrate 118, the test image comprising a plurality of regions 210 of print agent of a first colour. In some examples, the plurality of blocks 210 of print agent may comprise halftone patches. At block 504, the method 500 comprises scanning, using a scanning device, the printable substrate 118 to obtain a scanned image. In some examples, the scanning apparatus 216 may be used to perform the scanning. The scanning of block 504 may be performed using a scanning device forming part of or located in the print apparatus 100 (e.g. an in-line scanner), or using a scanning device separate from and remote from the print apparatus 100 (e.g. a flatbed scanner). Thus, in some examples, the scanning device may comprise a scanning device of the print apparatus 100. The scanner used for scanning the pattern printed on the printable substrate 118 may have a resolution of around 600 dots per inch (DPI) while the writing head may have a resolution of, for example, 1200 DPI or 1600 DPI (or more). In other words, the writing head 118 may include far more light sources than the number of pixels that can be individually resolved by the scanner. Thus, in some examples, linear interpolation may be used to correlate positions in the scanned image with light sources in the writing head. By using liner interpolation, a scanner may be used which has a resolution substantially less than the addressability of the writing head.

The method 500 further comprises, at block 506, processing the scanned image, using processing apparatus 218, 302, to identify a non-uniformly printed region (e.g. the region 416 in FIG. 4) of the print agent of the first colour. At block 508, the method 500 further comprises determining, using processing apparatus 218, 302, which light source of the array of light sources corresponds to the non-uniformly printed region 416, The method 500 further comprises, at block 510, determining, based on the identified non-uniformly printed region 416, an adjustment to be made to a parameter of the corresponding light source. In some examples, the parameter to be adjusted may comprise a power or a current to be applied to the corresponding light source. At block 512, the method 500 further comprises adjusting the parameter of a light source or multiple light sources in the array of light sources.

Figure 6:
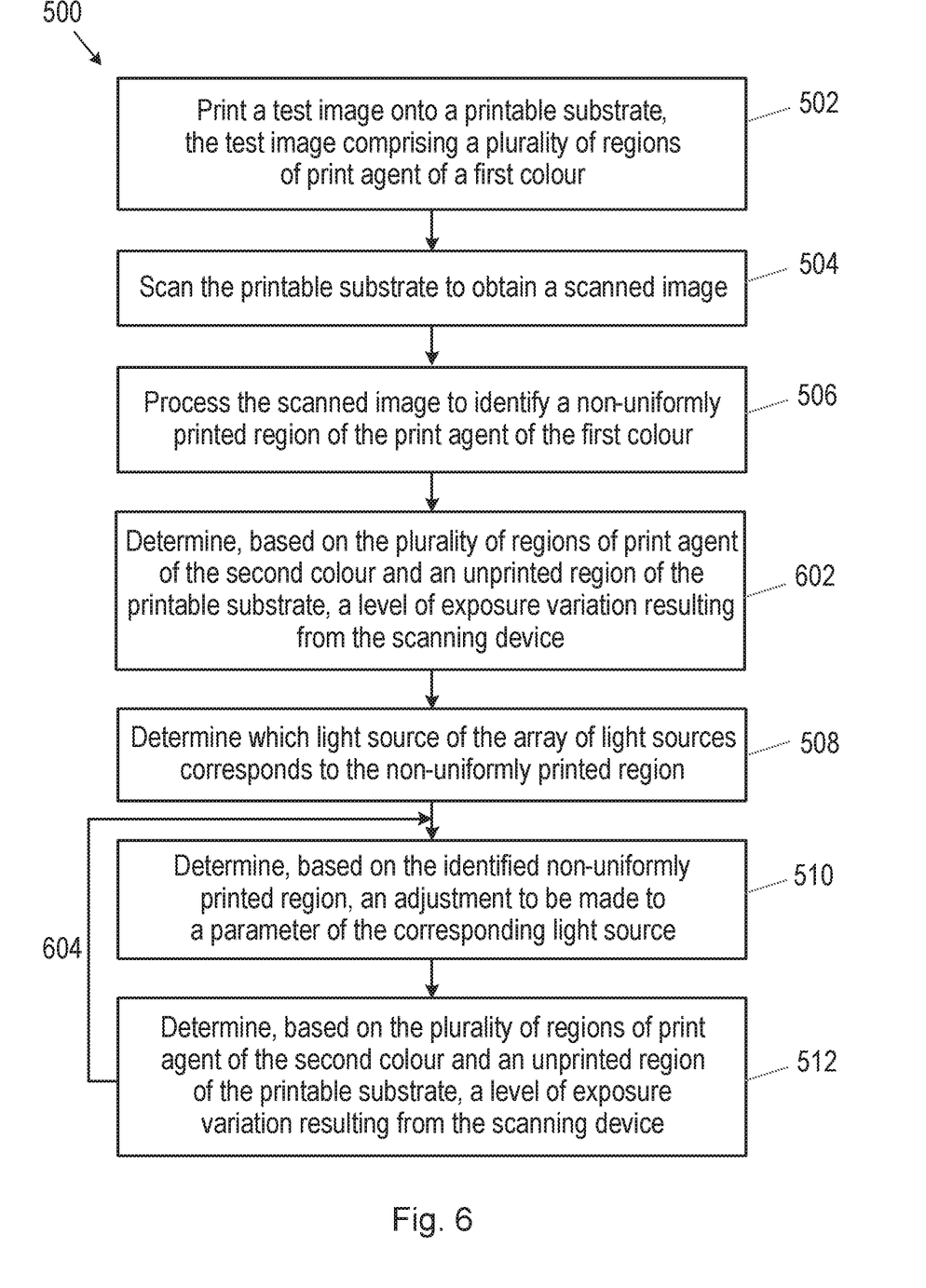
FIG. 6 is a flowchart of a further example of a light source uniformity correction method.

FIG. 6 is a flowchart of a further example of a light source uniformity correction method 600. The method 600 may comprise blocks of the method 500 discussed above. In some examples, the first colour (i.e. the colour of the print agent in the regions 210 of print agent) may comprise the colour grey. The test image may further comprise a plurality of regions 206 of print agent of a second, different colour. The method 600 may, in some examples, further comprise, at block 602, determining, based on the plurality of regions 206 of print agent of the second colour and an unprinted region 208 of the printable substrate 118, a level of exposure variation resulting from the scanning device. An appropriate compensation may be calculated for the determined level of exposure variation. In some examples, identifying the non-uniformly printed region 416 may comprise measuring reflectance values in respect of the print agent in the regions 210 of print agent. The reflectance values may, in some examples, be translated into dot area values or dot area densities, for example using the calculated exposure variation compensation.

In some examples, said determining (block 508) may comprise generating a non-uniformity profile in terms of scanned pixels in the scanned image. For example, a non-uniformity profile such as the one shown in the graph 406 may be generated, representing the reflectance or dot area density at various points across the block 210. The determining (508) may further comprise correlating points in the non-uniformity profile with positions of light sources positions in the array of light sources. In other words, a determination may be made as to which light source or light sources in this is the radiation resulting in the region 416 of non-uniformity.

Once an adjustment of a parameter of a light source has been made, the uniformity between the output of the light sources may improve. However, adjusting one parameter may cause other parameters to vary (e.g. currents of other light sources, temperatures of other light sources, and so on), and such variations may lead to further non-uniformities. Therefore, in some examples, parts of the method 500, 600 may be iteratively repeated to improve the uniformity. Thus, in some examples, the method 600 may further comprise iteratively repeating (indicated by the arrow 604 in FIG. 6) said determining (block 510) an adjustment to be made to a parameter and said adjusting (block 512) the parameter until a stop criterion is met. For example, the determining of block 510 and the adjusting of block 512 may be iteratively repeated until the non-uniformity is reduced to an acceptable level (e.g. below a defined threshold value). Repeating the measurement and adjustment process iteratively also means a better overall correction of the non-uniformity made be made in examples where a resolution (e.g. the DPI) of the scanner is lower than a resolution of the writing head 104. Furthermore, iterative adjustments take account of measurement noise and any inaccuracies in the adjustment factor applied to the light source parameter.

As noted previously, the pattern 204 may be repeated in the substrate transport direction of the printable substrate 118. Therefore, the plurality of regions or blocks 210 of print agent of the first colour (e.g. grey) are spaced over the printable substrate 118 in a direction parallel to the substrate transport direction. To take account of minor differences in print quality occurring as the printable substrate 118 moves through the print apparatus 100 during a print operation, the method may, in some examples, involve taking an average of reflectance values from multiple blocks 210 of print agent on the printable substrate. Specifically, in one example, measurements taken in respect of each block 210 of print agent of the first colour (e.g. grey) are normalised using its nearest block 206 of print agent of the second colour and its nearest unprinted region 208, to obtain dot area values. The dot area values for all of the blocks 210 may then be averaged in the substrate transport direction, to account for any variations in that direction. For example, for a particular position (e.g. a position in the 'x' direction) across the printable substrate 118 (i.e. in a direction perpendicular to the substrate transport direction), reflectance values may be measured for the first block 210 printed on the printable substrate, then for each other block printed on the printable substrate in the same position in the x direction. Once the measurements have been normalised (as discussed above), the measurements may be averaged for each position (in the x direction). Thus, identifying a non-uniformly printed region (i.e. the processing 506 of the method 500) may, in some examples, comprise measuring reflectance data from the plurality of regions 210 of print agent of the first colour at positions across an extent (e.g. in a direction perpendicular to the substrate transport direction) of the printable substrate 118. The processing 506 may further comprise calculating an average reflectance from the plurality of regions 210 of print agent for each of the positions across the extent of the printable substrate 118. By making use of an average taken over multiple blocks 210 of print agent, and by normalizing the data, as described previously, the method is able to take account of print streaks or bands occurring in the printed image due to other causes. Thus, the mechanism provided by the present disclosure is robust to other print defects.

Figure 7:
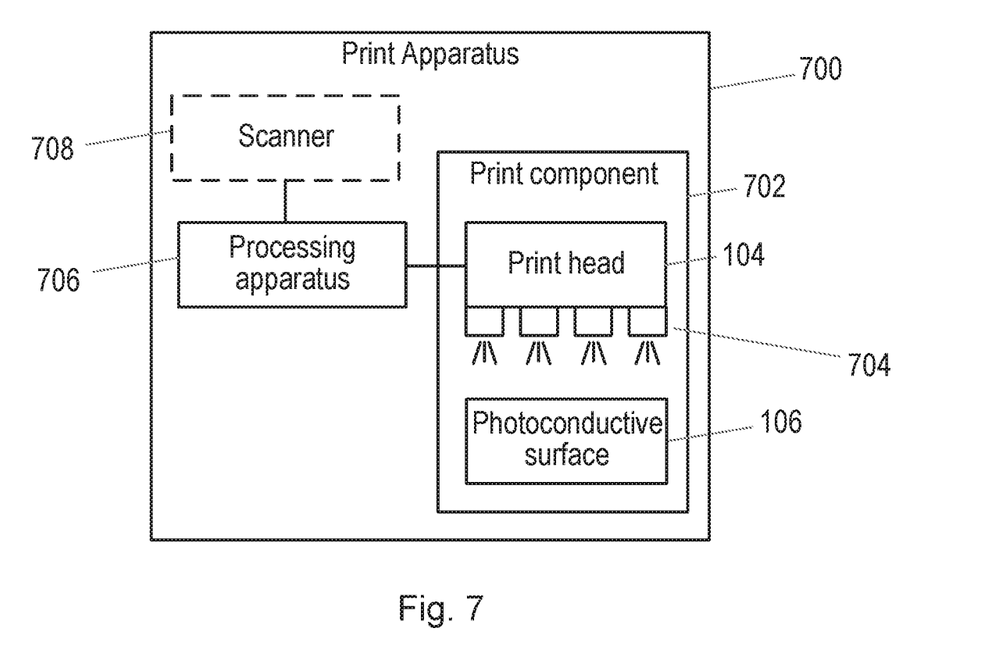
FIG. 7 is a schematic illustration of an example of a print apparatus.

FIG. 7 is a schematic illustration of an example of a print apparatus 700. The print apparatus 700 may, in some examples, comprise an LEP print apparatus. The print apparatus 700 comprises a print component 702 comprising a photoconductive surface 106 and a print head 104. The print head 104 (also referred to as a writing head) includes a plurality of light sources 704, each light source to emit radiation onto the photoconductive surface 106 to form an image to be printed with print agent onto a printable substrate 118 during a printing operation. The print apparatus 700 also comprises processing apparatus 706. The processing apparatus 706 may, in some examples, comprise the processing apparatus 218 and/or the processing apparatus 302. The processing apparatus 706 is to receive a scanned image of a pattern printed by the print component 702 onto a printable substrate 118, the pattern comprising a series of blocks 210 of print agent. The processing apparatus 706 is also to analyse the scanned image to identify a region 416 of non-uniformity within the plurality of blocks 210 of print agent. The processing apparatus 706 is also to determine a light source of the plurality of light sources 704 which is responsible for the region 416 of non-uniformity. The processing apparatus 706 is also to calculate, based on the identified region of non-uniformity, a power adjustment to be made to the light source to improve the uniformity. The processing apparatus 706 is also to adjust a power supplied to the determined light source according to the calculation.

In some examples, the print apparatus 700 may further comprise a scanner 708 (shown in dashed lines in FIG. 7, to indicate that it may be omitted) to scan the printable substrate 118 following the printing operation, to generate the scanned image.

Examples disclosed herein may also relate to a machine-readable medium comprising instructions which, when executed by a processor (e.g. the processing apparatus 218, 302, 706), cause the processor to perform a processing activity or multiple processing activities performed by the processing apparatus 706 of the print apparatus 700, as discussed above. For example, the machine-readable medium may comprise instructions which, when executed by a processor cause the processor to receive a scanned image of a pattern printed by a print apparatus onto a printable medium, the pattern including a plurality of blocks of print agent of a first colour printed during a printing operation in which light sources of a light source array irradiate a photoconductive surface; analyse the scanned image to identify a region of non-uniformity within the plurality of blocks of print agent; correlate a location of the identified region of non-uniformity with a corresponding light source in the light source array; determine, based on the identified region of non-uniformity, an adjustment to be made to a parameter of the corresponding light source; and generate a signal to effect the determined parameter adjustment with regard to the corresponding light source.

The present disclosure therefore provides a mechanism for calibrating or correcting variations or non-uniformities in the outputs of the light sources of the writing head of a print apparatus, to reduce print defects and inconsistencies in a resulting printed image. The correction/calibration may be performed when the writing head is first installed into the print apparatus, or periodically, to account for any change in output.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A light source adjustment apparatus, comprising:
processing apparatus to:
receive a scanned image of a pattern printed by a print apparatus onto a printable medium, the pattern including a plurality of blocks of print agent of a first colour printed during a printing operation in which light sources of a light source array irradiate a photoconductive surface to thereby form the pattern on the printable medium during the printing operation;
analyse the scanned image to identify a region of non-uniformity within the plurality of blocks of print agent;
correlate a location of the identified region of non-uniformity with a corresponding light source in the light source array;
determine, based on the identified region of non-uniformity, an adjustment to be made to a parameter of the corresponding light source; and
generate a signal to effect the determined parameter adjustment with regard to the corresponding light source to improve print uniformity.

2. A light source adjustment apparatus according to claim 1, wherein the plurality of blocks of print agent comprise halftone patches, and the first colour comprises grey.

3. A light source adjustment apparatus according to claim 1, wherein the pattern further includes a plurality of blocks of print agent of a second colour, different from the first colour.

4. A light source adjustment apparatus according to claim 1, wherein the pattern further includes a position indicator to correlate a particular portion of a block of print agent of the first colour with a corresponding light source of the light source array.

5. A light source adjustment apparatus according to claim 1, wherein the parameter adjustment comprises an adjustment of a current applied to the corresponding light source.

6. A light source adjustment apparatus according to claim 1, wherein the processing apparatus is to identify a region within the plurality of blocks of print agent as a region of non-uniformity if a reflectance of the print agent within the region falls outside of a defined range of reflectance values.

7. A light source uniformity correction method comprising:
printing, using a print apparatus in which an array of light sources emit radiation onto a photoconductive surface to form a test image onto a printable substrate, the test image comprising a plurality of regions of print agent of a first colour;
scanning, using a scanning device, the printable substrate to obtain a scanned image;
processing the scanned image, using processing apparatus, to identify a non-uniformly printed region of the print agent of the first colour;
determining, using processing apparatus, which light source of the array of light sources corresponds to the non-uniformly printed region;
determining, based on the identified non-uniformly printed region, an adjustment to be made to a parameter of the corresponding light source; and
adjusting the parameter of a light source in the array of light sources to improve print uniformity.

8. A method according to claim 7, wherein the first colour is grey, and wherein the test image further comprises a plurality of regions of print agent of a second, different colour.

9. A method according to claim 8, further comprising:
determining, based on the plurality of regions of print agent of the second colour and an unprinted region of the printable substrate, a level of exposure variation resulting from the scanning device.

10. A method according to claim 7, wherein determining which light source corresponds to the non-uniformly printed region comprises:
generating a non-uniformity profile in terms of scanned pixels in the scanned image; and
correlating points in the non-uniformity profile with positions of light sources positions in the array of light sources.

11. A method according to claim 7, further comprising:
iteratively repeating said determining an adjustment to be made to a parameter and said adjusting the parameter until a stop criterion is met.

12. A method according to claim 7, wherein identifying a non-uniformly printed region comprises:
measuring reflectance data from the plurality of regions of print agent of the first colour at positions across an extent of the printable substrate; and
calculating an average reflectance from the plurality of regions of print agent for each of the positions across the extent of the printable substrate.

13. A method according to claim 7, wherein the scanning device is a scanning device of the print apparatus.

14. A print apparatus comprising:
a print component comprising:
a photoconductive surface; and
a print head having a plurality of light sources, each light source to emit radiation onto the photoconductive surface to form an image to be printed with print agent onto a printable substrate during a printing operation; and
processing apparatus to:
receive a scanned image of a pattern printed by the print component onto a printable substrate, the pattern comprising a series of blocks of print agent;
analyse the scanned image to identify a region of non-uniformity within the plurality of blocks of print agent;
determine a light source of the plurality of light sources which is responsible for the region of non-uniformity;
calculate, based on the identified region of non-uniformity, a power adjustment to be made to the light source to improve the uniformity; and
adjust a power supplied to the determined light source according to the calculation.

15. A print apparatus according to claim 14, further comprising:
a scanner to scan the printable substrate following the printing operation, to generate the scanned image.

* * * * *